June 16, 1936.　　　A. H. ADAMS　　　2,044,458
MEANS FOR LIQUID TREATING MASSES OF FIBERS AND OTHER FINE SOLIDS
Filed Dec. 10, 1932　　　7 Sheets-Sheet 1
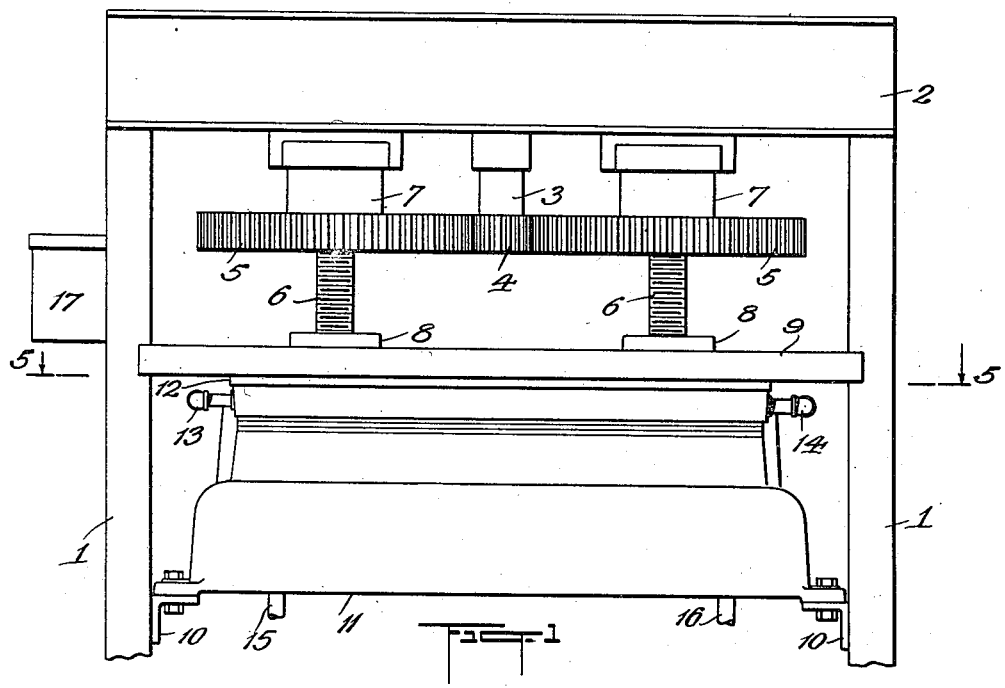
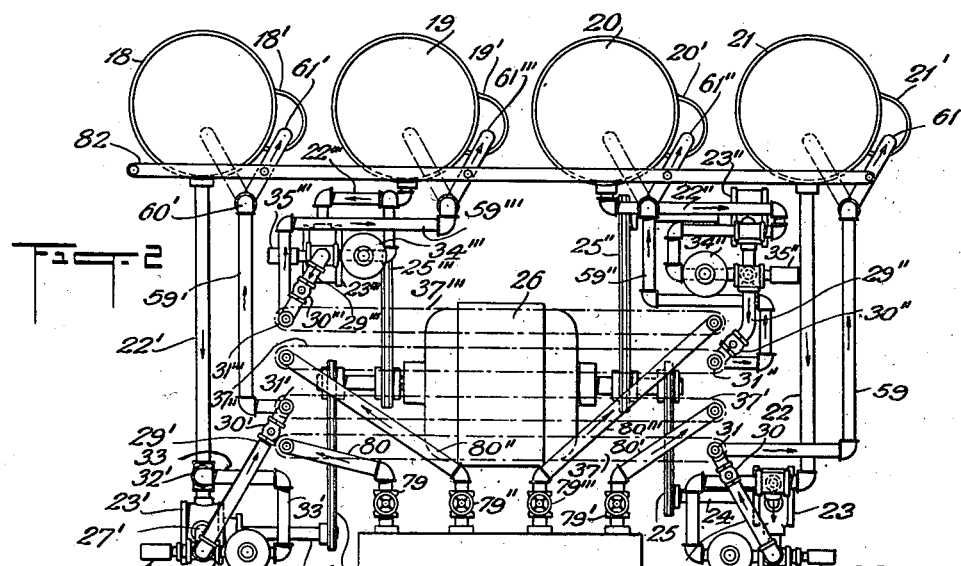
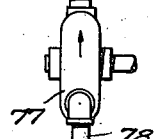
INVENTOR

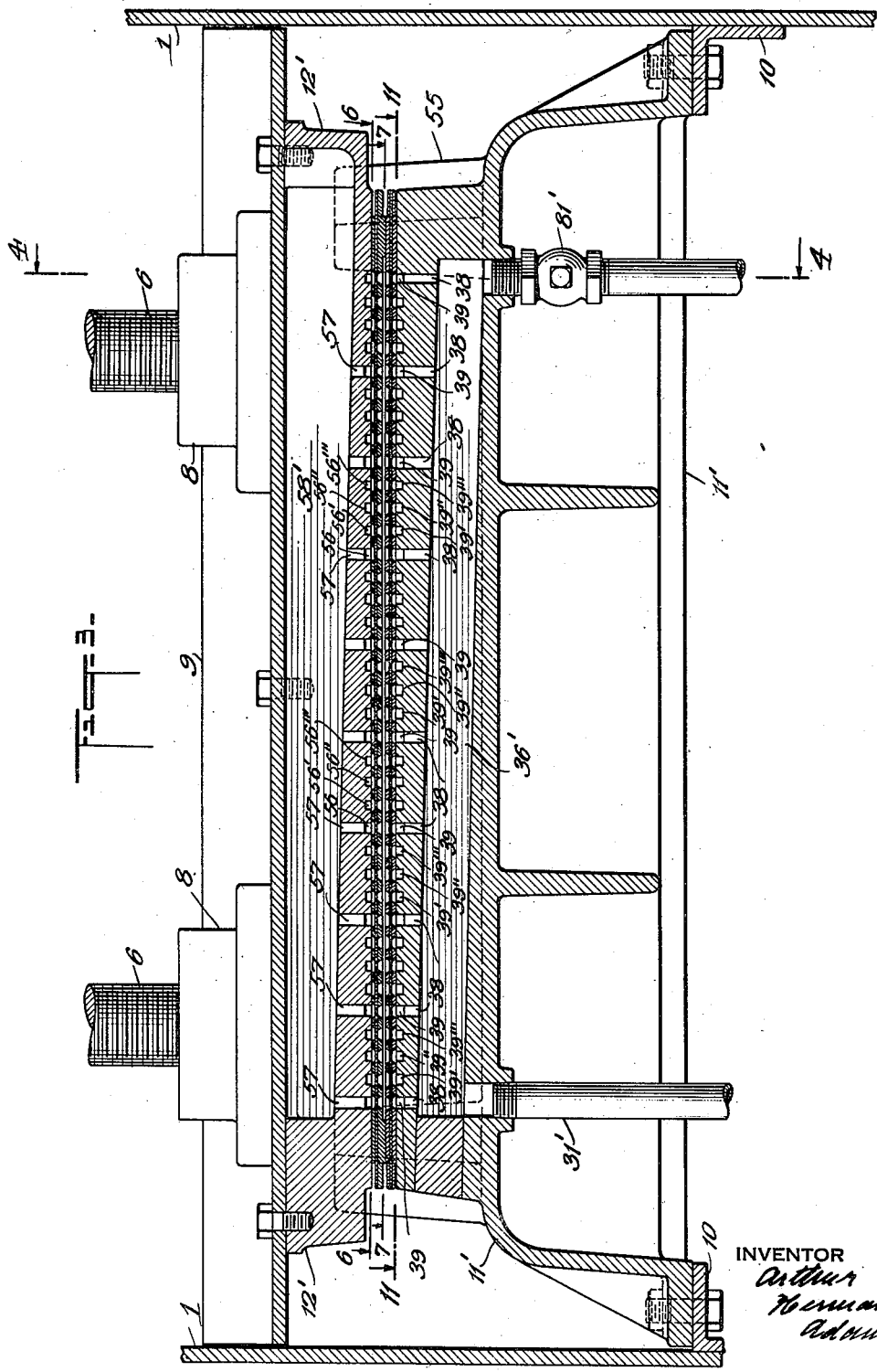

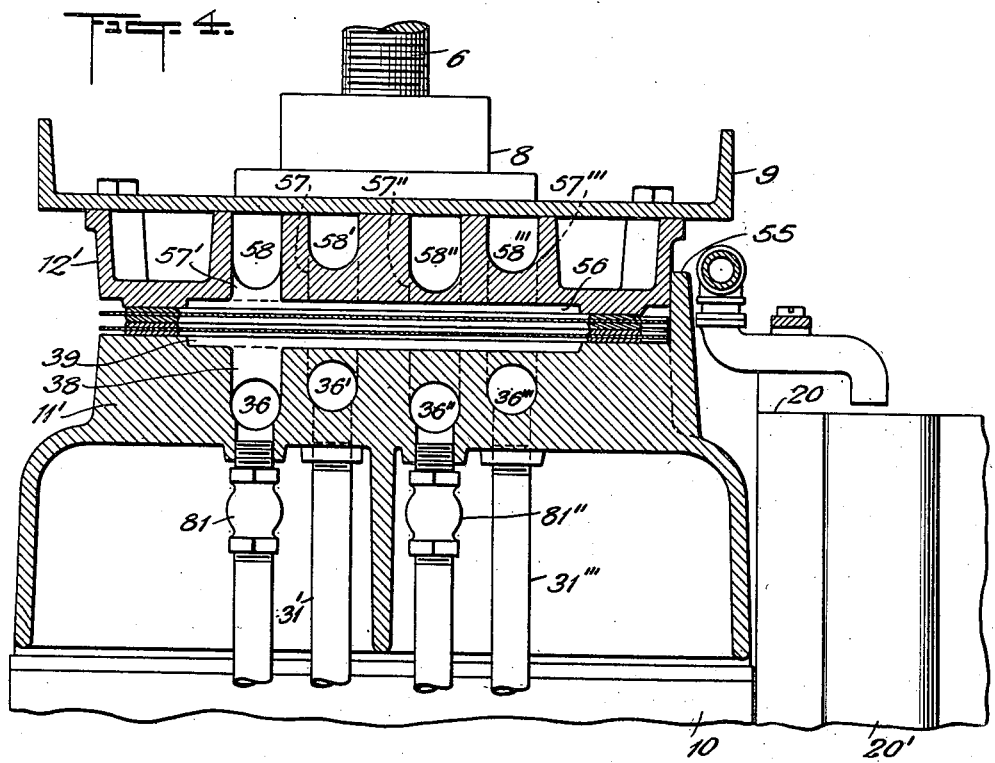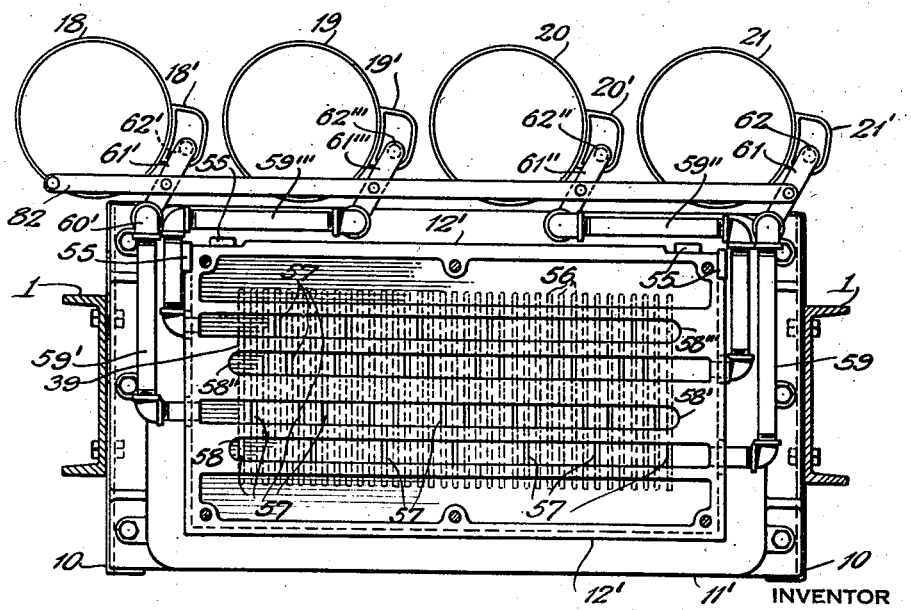

June 16, 1936.  A. H. ADAMS  2,044,458
MEANS FOR LIQUID TREATING MASSES OF FIBERS AND OTHER FINE SOLIDS
Filed Dec. 10, 1932  7 Sheets-Sheet 4
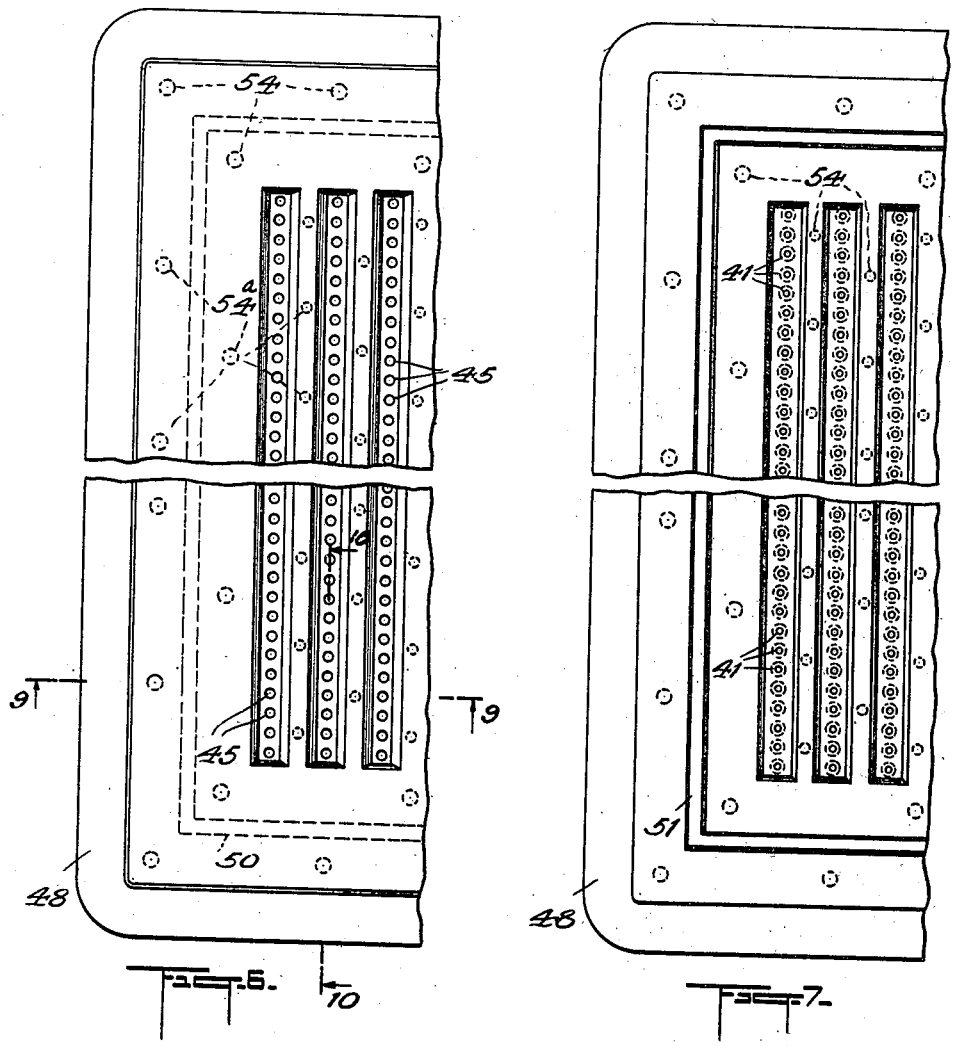
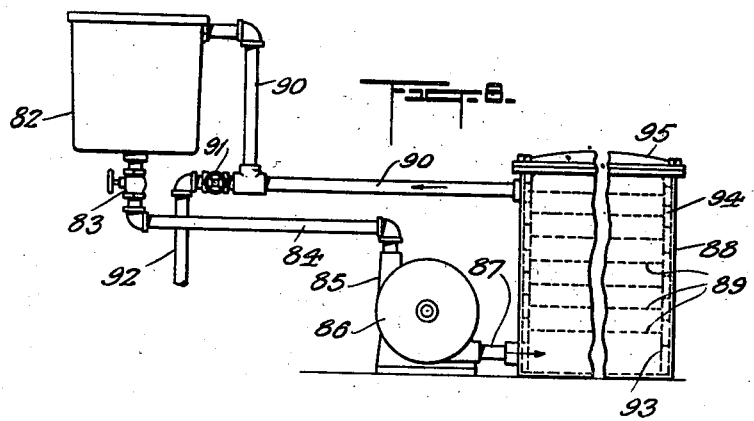
INVENTOR
Arthur Herman Adams.

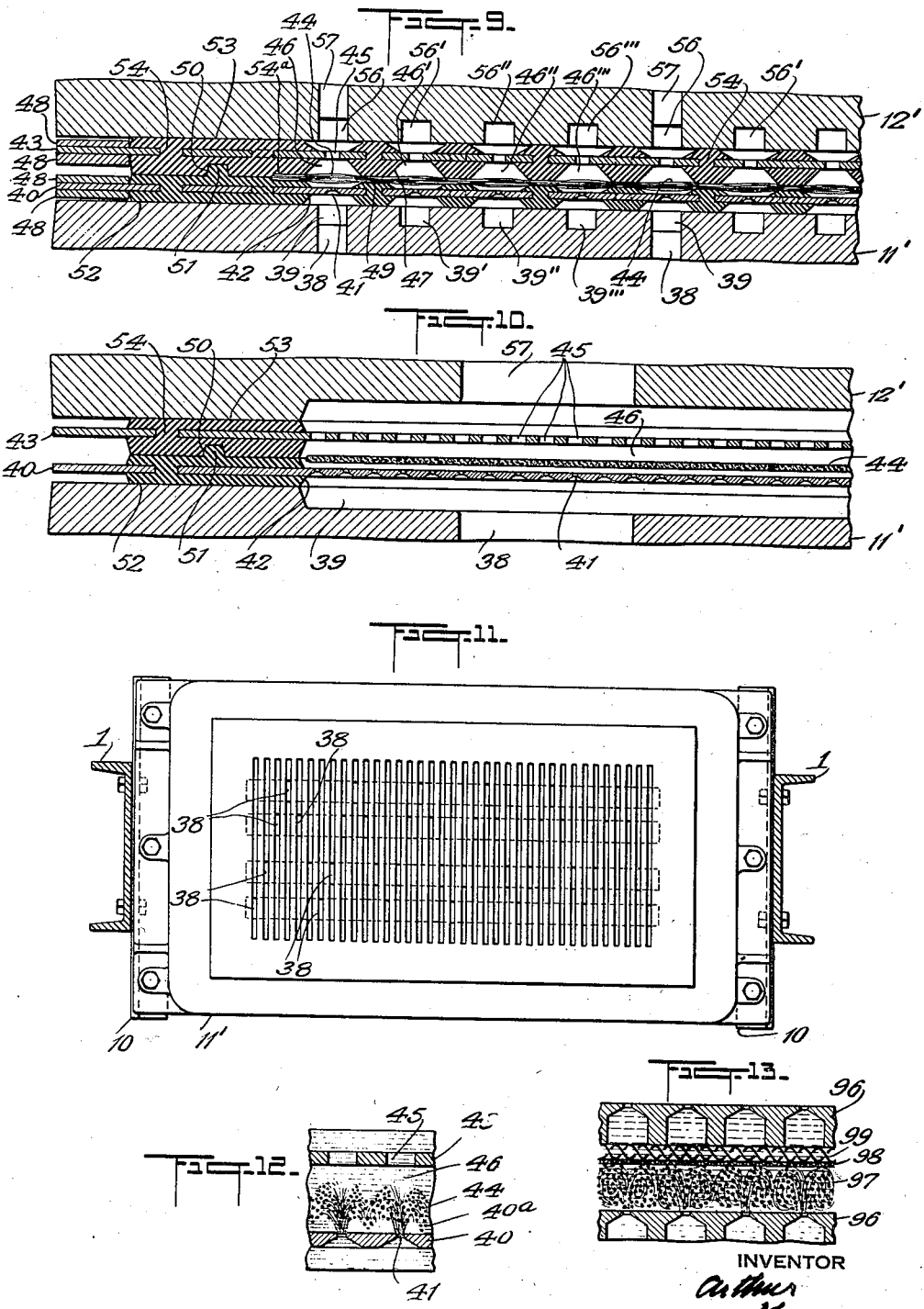

June 16, 1936.　　　A. H. ADAMS　　　2,044,458
MEANS FOR LIQUID TREATING MASSES OF FIBERS AND OTHER FINE SOLIDS
Filed Dec. 10, 1932　　　7 Sheets-Sheet 6
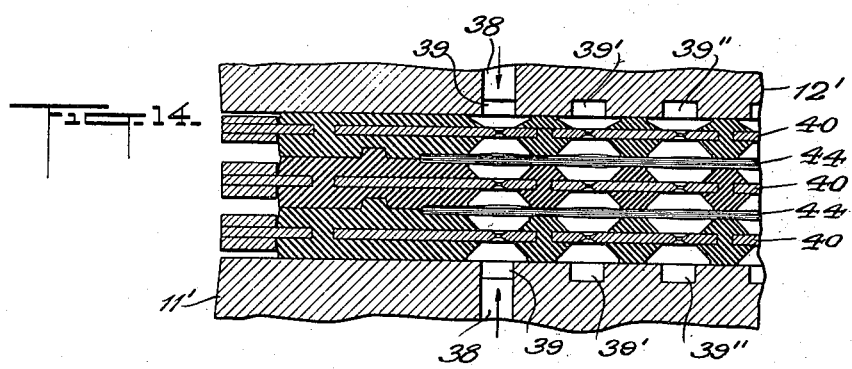
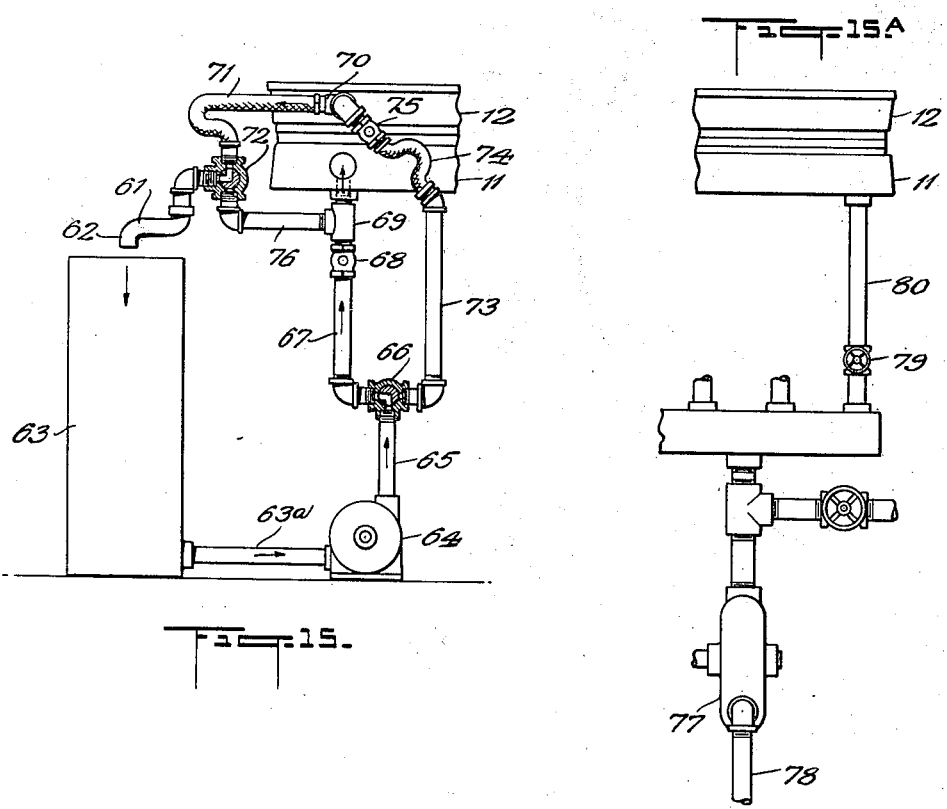
INVENTOR
Arthur Herman Adams

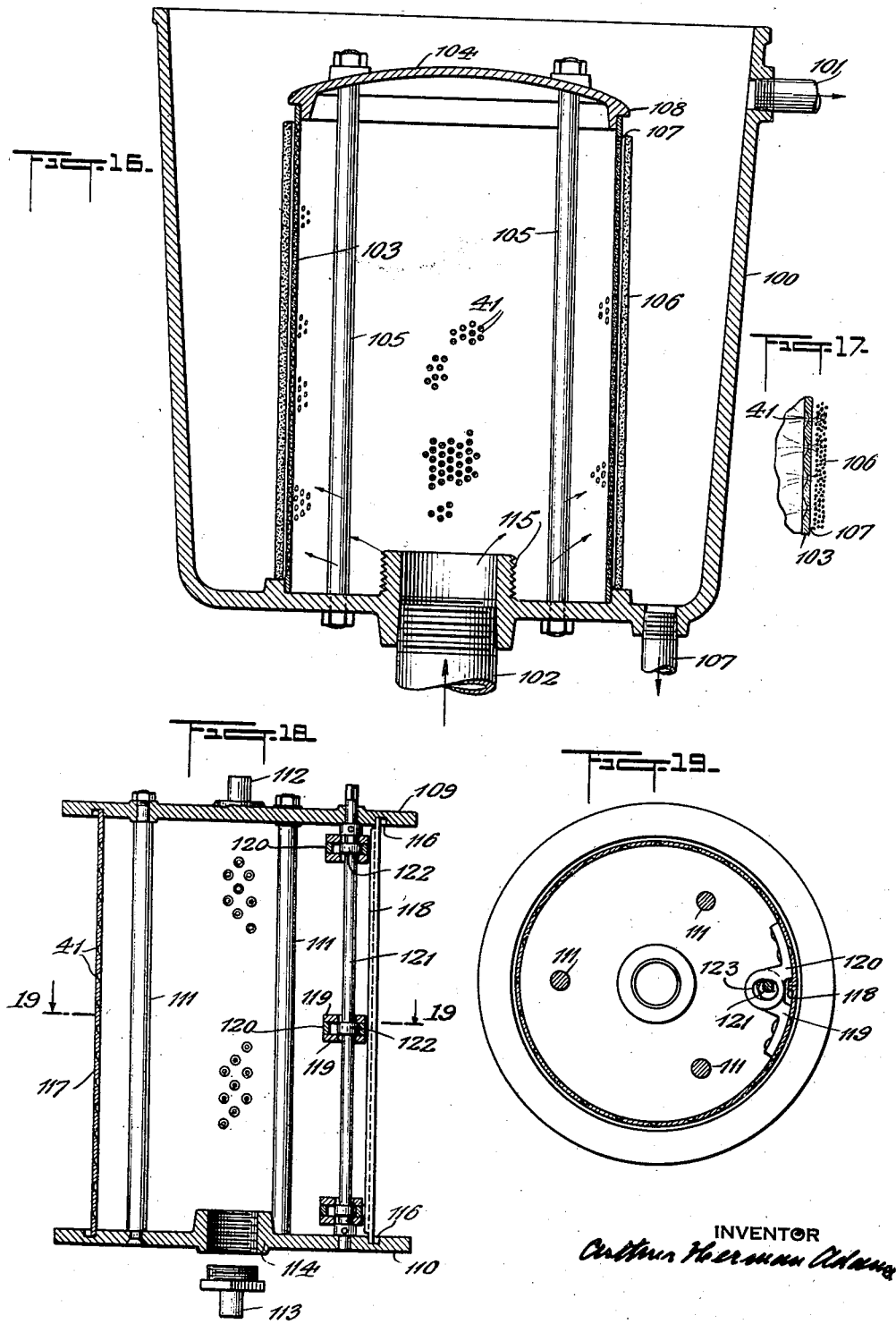

Patented June 16, 1936

2,044,458

UNITED STATES PATENT OFFICE 2,044,458

MEANS FOR LIQUID TREATING MASSES OF FIBERS AND OTHER FINE SOLIDS

Arthur Herman Adams, Yonkers, N. Y.

Application December 10, 1932, Serial No. 646,646

27 Claims. (Cl. 8—7)

This invention relates broadly to pressure flow or pumping means and methods for forcing the uniform penetration and uniform attack by liquids under pressure of otherwise not readily and uniformly penetrable masses of finely divided solids.

The main feature of this invention resides in the method of and means for internally subdividing a relatively slow moving stream of liquid under pressure into many closely spaced high speed fine streams or jets surrounded by liquid under pressure, for the purpose of more positive and uniform penetration and agitation of masses of finely divided fibrous or granular or flaky solids placed in the stream. It will be understood from the above that the moving liquid where subdivided into jets is still under pressure and that these jets form merely internal disturbances in the main stream of pressure liquid. Thus is provided a very powerful method of forcing liquids, without "channeling," into intimate and uniform contact with masses of finely divided solids; one which almost completely overrides the tendency of many of such solids to cohere in masses and to resist penetration except at weaker spots or channels.

One very useful application is to the pressure treating with liquors (dyeing, immunizing, washing, etc.) of textile fibers, e. g. yarns, threads, filaments and loose fiber, in such not readily or uniformly penetrable forms as skeins, filaments wound on bobbins, masses of so called "raw stock," etc. This is the preferred application herein disclosed in detail.

Another useful application is to the pressure stream leaching, washing or other form of liquid attack on granular, flaky or fibrous masses. A very large number of useful specific applications of the methods and structures of this invention will occur to those skilled in the chemical and process industries. It will be obvious that the purpose served by the intimate attack and treatment by liquids of finely divided solids may equally well be for the purpose of the resulting change in the solids or for the purpose of the resulting effect on the liquids. This invention provides means and methods that may be applied to facilitate many operations now performed in leaching columns, filter presses, centrifuges, and the like. It provides means whereby solids difficult of solution may be more rapidly dissolved, whereby liquid mixtures may be brought most intimately into contact with fine catalysts, whereby matter adherent or absorbed on fine solids may be purged out by the action of liquids either for the purification of the solids or for the collection of the matter, etc.

Objects

One of the principal objects of this invention is the provision of methods and machinery for the treating with liquor streams under pressure (e. g. dyeing, immunizing, etc.) of all kinds of yarn in skeins, of raw stock or loose fibers, and of other compact but not specially homogeneously or penetrably constructed masses of material, while avoiding that unevenness of result that has always, in pressure treatment of such masses by prior methods, been caused by the "channeling" or concentration of the liquor flow along chance paths or channels of least resistance through such masses.

Another main object is the provision in a pressure liquor circulating system of methods and means for accomplishing positively a uniform and intimate liquor penetration and agitation of masses of fine solids regardless of very wide variations in their natural penetrability.

One object is the provision of highly efficient means for intimately bathing all particles of a mass of finely divided solid matter in a circulating liquid, for the purpose of treating such solid matter by the liquid.

Another object is the same but for the purpose of treating or affecting such liquid by the solid matter.

Another object of this invention is the simultaneous pressure stream dyeing of skeins and the like in any desired number of areas of any number of different colors, for piebald and mixed effects.

Another object is the economical dyeing or treating of yarn in skeins, etc., with spots of many colors in very short lengths.

Another object is a more economical and rapid and uniform method for treating closely but not homogeneously packed masses of fibrous or granular materials.

Another object is the provision of a practical and economical pressure dyeing mechanism for fine yarns in skeins.

Another object is the provision of an economical method of treating or dyeing skeins and the like with a plurality of successive liquors (e. g. mordant, dye, fixing liquor, wash, etc.) with one handling.

Another object is the provision of a broadly applicable method for the very uniformly penetrating pressure treatment with any liquors of masses of finely divided materials of many kinds.

Another object is the provision of a new liquid pressure treating method, and of mechanism for practicing this method, whereby masses of yarns and filaments can be uniformly penetrated on original bobbins with consequent economy of handling.

Another object is a dyeing or treating method for yarns and textile materials in masses that will be unusually economical of chemicals and/or dyestuffs.

Another object is a new method, and a new mechanism for applying this method for the dyeing or treating of masses of textile or of other materials that are to be acted upon by liquors, and for doing this in a positively uniform manner and in an unusually brief time.

Another object is the provision of methods, and of suitable equipment to practice the same, and the outlining of the necessary principles understandingly to practice the same, for the pressure flow treatment in series of a considerable number of masses of material, whereby a desired stream of liquor is caused evenly to penetrate and act upon each of these masses in series so that a much deeper and much less homogeneously constructed total column or mass of material is evenly treated than by other methods.

Another object is to provide means for holding masses of substantially parallel laid filaments in the range of action of treating liquor jets in such a manner as to facilitate their more ready penetration.

Another object is the provision of methods, and of means to practice these methods, economically and with a minimum of labor to protect any desired number and size of areas on masses of textile fiber, (e. g. on yarns in skein form) against the action of all liquors while selectively and simultaneously penetrating other areas of desired size on the same masses by one liquor or by a number of liquors.

This object might practically be phrased as the provision of low labor cost means and methods for "spot dyeing" skeins in one operation with many different colors and in "spots" as short as desired.

Other advantages and specific applications of this invention will become clear upon the perusal of the outline below of the general principles involved, of the detailed description of certain specific embodiments, and of the claims.

*General, and discussion of principles*

Many methods are known for bringing into intimate contact all particles in masses of finely divided solids with liquors pressed or forced through such masses. Examples are the washing or treating of granular matter and residues in filter presses, in leach columns, or in centrifuges. An example, and one especially pertinent to the herein disclosed application of this invention to textile fibers, is the so-called pressure dyeing of yarns cross-wound loosely in cylinders or cones, which is done by pumping of dye liquors or the like through the cones from the inside to the outside and vice versa. Some of these methods use combined pressure and suction, most of them use reversals of flow. But all the methods heretofore practiced and the means used are not universally satisfactory in that they tend to produce uneven results in many cases, and with some of the most useful liquors and chemicals, also in that the results are always uneven unless the masses of fibers are quite loosely and very evenly constructed. Unless this is well done the liquors in these well known methods of pressure dyeing tend to flow more freely through one portion of the mass or cone than through another. This is often called "channeling". As an example, fine yarns laid parallel, as in skeins, instead of cross-wound, offer such extremely high and variable resistances to the penetration of a dye liquor stream that they cannot be dyed through by any methods heretofore known of forcing liquors through stationary masses. Practically it can be said that successful skein dyeing has required the skeins to be turned and/or moved or agitated frequently or continuously while loose and submerged in a bath of the liquor, or it may be while held under a copious flow of the liquor.

Methods heretofore known for "spot" dyeing skeins or masses of fibers, i. e. for dyeing or treating one portion of such skein or mass with one liquor and treating another portion of the same with another liquor, in order to produce variegated or piebald effects, have depended either (a) upon suspending a small portion at a time of the skein or mass of fibers in a bath (which is much labor and can produce only relatively large lengths or areas of each color, and which method produces areas of not sharp delimitation or cut-off) or else such methods have depended (b) upon protecting certain areas of the skeins or certain length of the fibers from the action of the liquor by either protective coatings such as wax or by protective clamps faced with rubber or other impervious and resilient material and upon thereafter immersing the skeins or masses so partially protected into baths or heavy streams of liquor and upon so agitating or moving them while so immersed as to loosen or open the unprotected fibers. The coating (e. g. wax) method applied to yarns involves substantially as great difficulties in the exact local application of the wax or coating as are involved in the local application of dyes. It is practiced mostly in the artistic handicraft production of ornamental dyed patterns on pieces of cloth, or "batik" work. The clamp protecting method of "spot dyeing" yarns is commercially practiced and is taught for example in Patents 1,498,079; 1,461,822; 1,722,781. It has been commercially successful down to lengths of "spot" of about two inches, rarely less, and with rarely more than two colors. The colors must be successively superimposed, the darker on the lighter.

The conventional and primitive method of immersion and agitation of the material in a bath is here utilized with only the addition of a technique for clamping-off certain not-to-be-dyed areas. This is not a pressure treating method.

A demand exists for yarns piebaldly dyed in much shorter "spots" and with many more colors on one yarn than could be produced by any of these known methods. This demand may, at a cost, be met by various known dye printing methods, but these cannot be applied to yarns or fibers in skeins or masses. Moreover not all kinds of fibers and dyestuffs or treating liquors can be so handled.

This present invention was occasioned by the need to solve the problem of "spot" dyeing fine rayon and other yarns in skeins with very short "spots" and of simultaneously applying any desired number of different colors or liquors. It depends for bringing intimate contact of the liquor to each of a mass of fibers not upon mechanical agitation for opening the mass while immersed in ample liquor, as in the three patents mentioned above, nor upon unaided use of pressure to force liquors through the skein or mass (which as pointed out, if the mass has not been prepared or built with great porosity and homogeneity is accompanied by channeling i. e. by the finding by the stream of certain less resistant channels through the mass with consequent very uneven dyeing), but upon the principles of hydraulic mining and of the needle shower combined with a high pressure pumping treatment such as the Franklin.

The methods and means arrived at by this combination of principles are found to be advantageously applicable not only to "spot dyeing" of skeins, but to all kinds of liquor treatments of textile masses, and to liquor attack of all kinds on granular or finely divided solid matter.

In this invention a confined stream of liquid under pressure is intercepted by a plate or diaphragm containing small orifices (distributed in any desired pattern) of such a number, shape and size that the resistance to the stream of this orifice plate, or "choke screen" as it will hereinafter be termed,—is larger than any other impedance to the stream. This means that the resistance of the piping and of any penetrable solid masses in the path of the stream must be materially exceeded by the resistance of the choke screen or screens. With this condition fulfilled and with adequate head and volume in the stream, the larger part of the stream energy as it passes through the choke screen is converted into the kinetic energy of a multitude of small high velocity jets. These, it will be understood, are jets within the stream and not into air or open space. These jets have a tremendous hydraulic mining or penetrating effect on any masses of granules or fibers in their active path, and also set up violent eddy currents and turbulences in the slower moving liquid around the jets. These fine local violent disturbances of the liquid cause it to agitate and intimately to penetrate practically any masses of fibers or granules in the zone of jet and eddy activity.

The total energy of flow of a pressure stream of liquid so subdivided into jets and having closely spaced alternating portions or zones of relatively very different kinetic energies is more entirely converted into energy of turbulence. Such a stream is incomparably more effective in penetrating and internally disturbing all kinds of masses of particles or fibers, especially the more coherent and impenetrable masses, than is any pressure stream of equal energy but of smooth and relatively unturbulent flow, and therefore lacking the juxtaposed small stream portions of widely differing kinetic energy, i. e. lacking what we may perhaps term a fine grained kinetic contrast.

It is this fine grained internal jet and eddy principle that with its applications constitutes the main feature of this invention. The principle is made useful by spreading out masses of finely divided solids to be liquid treated—they must be spread in layers not exceeding in thickness the active length of a jet, but there is no other limitation, they need not be spread with any regularity of structure or of thickness—and by holding these layers or masses within a pumped or pressure stream and in such a described jet and eddy portion (or fine grained "kinetic contrast" portion) of that stream.

In a textile dyeing application, for instance, the skeins or other textile masses are held within the enclosed pumped stream of liquid, as near as is practicable to, but not clamped or pressed against, the outlet or jetting side of a choke screen, and the filaments or fibers are separated, agitated and permeated by the violent but minute alternating push and pull of the jets and eddies.

If the choke screen or screens are the preponderant resistance in the stream flow—which means that if the piping and other passages are ample and the stream flow large enough, even when very unevenly distributed masses of fine solids are held near the choke screen, these uneven masses have practically no effect on the distribution of liquid pressure over the inlet side of the choke screen. The jets of liquor projected through each of the many orifices will be substantially equally strong and penetrating. These jets will penetrate to a considerable depth into the most compact masses (e. g. of yarns or fibers) if the latter are held near to the jets. It has been found by experiment that there is very uniform and intimate treatment of the particles or fibers for a considerable area about each jet.

The jets are spaced, according to the material to be treated, closely enough so that these areas of action overlap.

Illustrating the power of this choke screen method of liquor penetration to overcome any and all irregularities in the distribution of the masses (this is its peculiar property) is the following fact:

In the application of this invention to the dyeing of textiles, skeins or masses of yarn are normally spread as uniformly as possible over the jetting area of a choke screen, thus covering all the jets and opposing to all of them a more or less uniform resistance. If instead, a single skein or two be placed across the middle or one end of such an area, so that half or three quarters of the jets are not covered by yarn and not delivering into a resistant textile mass, it will still be found that this single skein or two will be penetrated just as uniformly and dyed as evenly, quickly and thoroughly as though the whole area of the choke screen had been uniformly covered to the same depth with yarn. The choke screen method practically eliminates "channeling" or seeking of the easy path by the liquor.

After the liquor delivered in jets has passed through a mass of material it of course gathers together again into a relatively slow and unturbulent stream. As a matter of fact the individual kinetic energy and identity of the jets is or should be, pretty nearly lost in passing through the treated mass. More velocity than this is wasteful. If now the liquor, reformed as a stream, is intercepted by a second choke screen just like the first, that second choke screen will perform exactly as the first. It is only necessary that the total pressure of the pump or liquor source and the size of the piping and passages be adequate to deliver against the resistance of both choke screens (and of all treated masses in the flow—which resistance a proper jet and eddy action reduces and makes almost negligible) a quantity of liquor great enough to force each choke screen orifice to emit high velocity jets.

It may be remarked here parenthetically that a thick skein of damp fine yarn laid flat and uniform is virtually impenetrable to nonturbulent water under pressure, and might therefore be expected to introduce in the flow path a resistance comparable to or superior to that of the choke screen, thus rendering the latter ineffective. The drilling or "hydraulic mining" effect of the needle jets in such thick matted masses of textile, however, overcomes this difficulty. The yarns or fibers are quickly loosened and separated, and this action of the jets almost instantly reduces the resistance of the textile material in the flow path to a value far below that of the choke screen, and thus the latter is able to take the major part of the pressure drop, as is necessary to get active and uniform jetting over its whole area. A too slow and gradual application of the pressure at times, and in certain conditions, permits the textile masses to maintain the natural high resistance and thus to steal the pressure drop away from the choke, and thus to prevent the formation of sufficiently active jets and eddies. The pressure should be applied quickly to avoid this.

Resuming the thought of the last paragraph but one, it can be seen that any number of choke screens may similarly be used in series (superposed) so long as the total or overall pressure is adequate to provide a sufficient drop in pressure across each one to cause all orifices to jet strongly. The total pressure of the source for a two-screen series set up will obviously require to be about twice that for a single screen, etc.

It is not necessary that the patterns of the orifices in two screens in series be the same, only that the resistance be about the same. If screen #1 has fewer standard size orifices than screen #2 it is obvious that the gallons per minute necessary to produce strong jets through all the orifices of #2 can only be obtained by still stronger jets through the fewer orifices of #1. In that case the drop in pressure across #1 will be greater than across #2. To a very limited extent this inequality of resistance of two or more screens in series is allowable. It might even be desirable should one wish for any reason to treat, for example, very fine yarns in series with coarse yarns or in series any two different masses requiring really different jet strength. Any very large difference in resistance of two choke screens in series is, however, not possible due to the laws of liquid flow through orifices. The velocity of the jets, with a given total flow, will obviously be inversely as the orifice area. Thus, with X gallons per minute of total flow, a screen of 100 standard orifices would be forced to pass twice as much water per orifice (i. e. would give jets of double velocity) as a screen in the same flow having 200 orifices. But so great a difference is impractical because the laws of liquid flow through fine orifices are such that the resistance of an orifice increases very much more rapidly than the velocity through it. With any one given liquid and given orifice hydraulic theory states that the pressure drop varies as the square of the velocity of the jet. There are reasons to think that the pressure drop varies with jet velocity even more rapidly than this when the orifices are very small. The orifices so far found best for textiles are about 1 mm. in diameter.

The above physical principle, which is that of the needle shower, is important in this invention. Were it not true that the water pressure directly behind an orifice must be at least quadrupled to force only twice as much water per minute through the same, the choke screen of this invention would not so very uniformly provide almost identical jets through every orifice. Those orifices directly in line with the incoming stream would pass more water (i. e. be higher in velocity) in direct proportion to the different higher pressure they would receive as compared with those out of the direct line of the stream. Uneven jetting and uneven dyeing would result. The principle enunciated, however, insures a very great degree of equalization of the jets all over the screen. An extraordinary freedom of this method from "channeling" or any other bad influence of unevenly packed material is due to this physical principle.

For fully understanding and practicing this invention on textiles one more fact or principle must be grasped. As stated above the masses to be penetrated, agitated and liquor treated by the jets must be held near enough to the outlets of the orifices to receive adequate jet force. At too great a distance away the jets will have dissipated their energy in the intervening liquid.

Parenthetically the possible misconception must again be forestalled that these are jets into air; the whole system is closed and filled with liquor. The air in the system just prior to starting the pump is, and should be, carried out with the first flow of liquor as in any piping system. Permanently trapped air may cause irregular action. The agitation and eddies in the mass of liquor surrounding each jet are very helpful in treating the granules or fibers in the vicinity of the jet.

The choke screens for this reason are preferably horizontal and the first flow, at least, of the liquor is preferably upward to carry out any air more quickly.

Reverting to the final principle to be understood, which relates to the means for holding textile fibers in the active jet range, it has been found, if the textile is held against the jets by a lattice, or by a perforated plate or screen of bars or wires, however sparse and fine, placed on the opposite side of the textile mass from the jets, that the force of the jets is such that a few fibers on the lattice side tend to be compressed together where they touch the wires or bars and will not be so well dyed as the rest at these particular spots, particularly if fine and laid parallel. If a skein of fine rayon yarn is spread over a lattice of widely spaced fine wires and by it held against the jets there will result good dyeing except for some poorly dyed small areas, a few yarns deep on that side of the skein away from the jets, which areas reproduce the pattern of the lattice wire, and show where the skein pressed against these wires. In other words to avoid absolutely any minute undyed areas due to supporting lattice, the yarns or fibers must span the area of jets and be held into the jets merely by their own tension.

This method of holding textile fibers against the jets is preferred for another reason: it greatly facilitates thorough agitation and penetration. The yarns held in the jet and eddy influence by being stretched across the jet area will, under the jet pressure, belly away slightly and open up more easily, will be much agitated and be more quickly and uniformly laved by the jet and its subsidiary eddy currents than if they are compressed by the jets against any support, however fine, on their opposite side. This we may call the "hammock effect".

It will be understood that the above remarks are specific to the treatment and penetration of textile fibers, and especially to masses of parallel laid fine yarns as in skeins. Granular materials, like loose fibers or "raw stock" are so much more easily dislodged and thrown into the turbulent eddy currents around each jet, that they may (and must) be held in the active jet range by lattices or screens, without danger of some granules failing to be moved and adequately treated by the liquor.

This desirability of the "hammock effect" for fine yarns laid parallel limits the length of such yarns that may be treated in one span by the jets from a flat choke screen if minute marks of supporting lattice wires on some of the yarns are objectionable. When "spot" dyeing of yarns is practiced to get mixed or heather effects in fabrics such minute marks are frequently not objectionable.

A span or hammock upwards of 2" long can be penetrated, even at the middle where it bellies farthest away, by the jets of strength preferably used. Doubtless more powerful jets could be used with a greater range of action, thus increasing the allowable hammock span. Or (more economically) the size and range of action of only those jets opposite the middle and hence most distant part of the hammock span could be increased, by making their orifices larger.

However it is clear that where the masses to be treated are fine yarns in skeins, the flat choke screen is fundamentally adapted only to treating limited spans. Exceptions of course are the not infrequent cases where the marks of a supporting lattice back of the yarn are not objectionable.

Where longer spans of yarn or fabric require to be treated without lattice support, as for example if six or eight inch lengths of very fine rayon in skeins were to be dyed one color, the choke screen area for treating this length must be curved or bellied out to conform to the bellying of the yarn or fibers, thus bringing all the jets close to the yarn without the use of a lattice.

The cylindrical dyeing machines herein disclosed for dyeing whole skeins to one color, or for treating yarns or filaments on bobbins, exemplify perfectly the use of curved choke screens. Such cylindrical machines could obviously be constructed having radial clamps and internal partitions, so as to dye portions of the skeins with one color and other portions with other colors. This structure would be useful over the flat machine only where one color in lengths or "spots" of over 2" and less than the full skein length is desired.

For non-textile materials, such as granular solids or residues, the flat choke screen is best of course with fine lattices or screens to hold the materials into the jet action. For any material except long filamentary material the curved choke screen offers no advantages.

The above covers the broad principles of this invention that are special to it as distinct from particular adaptations and structures.

It may however be mentioned that, as is well known in pressure and vacuum dyeing of yarns cross-wound in cones, most treating liquors become more or less exhausted in passing through much material. Thus the material where the flow enters is more heavily treated than where the flow emerges. This fact is just as true in this choke screen process as in the Franklin or other prior pressure dyeing processes. If, for example, a considerable number of skein layers, with their choke screens,—are superposed or operated in series, the first layer of skeins will tend to be dyed more strongly. Just as in the Franklin and similar processes it is often desirable to provide for reversing the flow of the liquors to equalize the dyeing or treating. In practicing such a many-layer reverse-flow application of this invention to "spot" dyeing of skeins, the hereinafter described clamping ridges or supports for the skeins must be made high enough on both sides of the skeins to hold the spans or hammocks far enough away from both the upper and the lower choke screen to avoid contact when "hammocked". In a unidirectional application to spot dyeing the yarns may be held much closer to the screen by which they are treated because they hammock in only one direction. Due to this necessary greater separation between yarn and choke screen in a reverse flow machine of this invention, somewhat higher pressures and more powerful jets are desirable.

Where treating granular or loose fibrous materials which cannot be held in the jet action by their own tensile strength, but that must be held by fine screens or lattices, reversal of flow cannot ordinarily be practiced without various difficulties in the clogging of choke screen orifices.

In laying out most economically patterns of choke screen orifices or "jet patterns", for treating skeins, the fact is pertinent that the dye liquors effectively reach parallel filamentary material or yarns farther from the center of each jet in the direction of the filaments than they do across the filaments. The area of good dyeing of skeins about any one jet is a long oval, about three times as long as broad. The orifices per inch along the grain or direction of the yarns should be only a fraction, say one third, of the number per inch across the grain. In dyeing raw stock or fabrics this would of course not be so, nor in the treatment of granular or finely divided solids.

Finally, to complete the understanding of how to practice this invention, it must be understood that there are two different possible methods of handling the supply and depletion and exhaustion of treating liquors. These may be called the make-up method and the unit load supply method respectively.

For the make-up method, in the tank or container for the liquor will be placed far more than is needed to treat that load of material that the machine will contain at one time. The chemical or treating power of the liquor supply will be but unnoticeably exhausted by treating this one load of material. The volume will also be very slightly depleted or reduced by one load. This loss in volume is currently made up by adding proper quantity of liquor more concentrated than the original supply. This concentration is made just such as to restore the current exhaustion of the whole supply.

For most dye liquors and textile treating liquors this has been found the best and most easily practiced method. All it requires is an experience-based routine of adding dyestuffs or chemicals to the supply tank as fast as they are removed by the textile loads treated, and, currently making up with water the depleted volume. For some liquors and conditions residual products or products of combination with the solids or textiles, also plain dirt, will accumulate quite fast and the whole tank of liquor will thus become progressively adulterated by such products and finally too much adulterated or poisoned to be satisfactory. It must then either be thrown out or purified (e. g. by filtering or otherwise).

This make-up method is in general the preferred method and might be considered, from the proportions of the containers shown, to be the one disclosed herein, though no change in the structures shown is needed to practice the unit load supply method, but merely the use of smaller quantities of liquor.

In the unit load supply method the exact quantity of liquor and of the right concentration, to treat one load of material in the machine, is placed in the supply tank and circulated until the treatment is complete and until the liquor is sufficiently exhausted or contaminated. It is then drained from the tank and replaced by a fresh quantity for the next load in the machine.

For any particular problem the experienced man will have no trouble in determining by a few trials which method is most economical.

Description

In the drawings Figure 1 shows, without pumping and liquor supply equipment, a front elevation of the upper part of a practical general purpose pumped stream treating or dyeing machine or press in which the methods of this invention can conveniently be practiced; a machine in which, by varying the details of the equipment used in and with it, such as pumps, liquor distributing plates or platens, choke screens, etc., almost any fine solid may be intimately laved by liquids.

Figure 2 shows a plan view of one typical pumping or circulating equipment, for using four different liquors and a water wash, that may be used with the machine of Figure 1 for instance for four-color spot dyeing.

Figure 3 is a cross sectional elevation through the length of one color channel of a set of channeled or liquor-distributing platens and choke screens suitable for use with the four-color pumping equipment of Figure 2. This view also shows the lower end of the two screws of the Figure 1 pressing machine and certain other parts of the latter so the relationship will be clear.

Figure 4 is a section of these same parts but across the color channels, i. e. it is a sectional elevation taken on the line 4—4 of Figure 3.

Figure 5 is a sectional plan on the line 5—5 of Figure 1, with the assumption that the pumping outfit, the platens, choke and clamping screens and equipment details are substantially those of Figures 2, 3 and 4, i. e. that the machine of Figure 1 is equipped for a four-color spot dyeing operation. The arrangement of the color ports shown in Figure 5 however is, for purposes of illustrating the possibilities, made a variant of the exact arrangement of the color port arrangement shown in Figure 3.

Figure 6 is a plan view along line 6—6 of Figure 3, showing the top appearance of one end of the clamping screen and choke screen pile-up for this four-color operation.

Figure 7 is a plan view along line 7—7 of Figure 3 showing the top appearance of the choke screen with the clamping screen removed.

Figure 8 is a diagram showing the simplest one way circulating system for forcing liquor upward through any closed pack of choke screens in series, such as might be suitable for washing sludges or leaching granular materials.

Figure 9 is a section along line 9—9 of Figure 6, but showing a portion of the upper platen not visible in Figure 6.

Figure 10 is a section along line 10—10 of Figure 6, but showing ditto.

Figure 11 is a plan view along line 11—11 of Figure 3, showing the top appearance of a lower channeled platen suitable for a four-color spot dyeing operation, but illustrating also a slightly different color port arrangement than in Figure 3.

Figure 12 is an enlarged cross section of a minute portion of a choke screen in action with the jets impinging upon and penetrating a skein or parallel mass of filaments, also indicating the turbulent eddy currents produced.

Figure 13 is a similar section showing jets acting upon a mass of loose granular matter backed up by a fine lattice.

Figure 14 is a cross section, entirely similar to Figure 9, except that it shows the necessary modification of the choke screens for treating several layers of yarns in series and with a reversal of flow.

Figure 15 is a diagram showing a single liquor circulating system arranged for reversal of flow, for cooperation with choke screen structures like that of Figure 14.

Figure 15A shows diagrammatically the branched circulating system like the water washing system of Figure 2, for simultaneously circulating one common liquor through several otherwise distinct color or liquor passages.

Figure 16 is a sectional elevation of a cylindrical choke screen, and container, for dyeing or treating skeins all over the same.

Figure 17 is a section of a minute portion of such a cylindrical screen in action, indicating the jet and eddy action, and the separation tending to be maintained at all points between choke screen and skein.

Figure 18 is a sectional elevation, and Figure 19 a sectional plan along line 19—19 of Figure 18, of a bobbin or reel having for core a slightly collapsible cylindrical choke screen, and capable of replacing the fixed cylindrical screen of Figure 16, for the uniform dyeing or treating of filaments wound thereon.

The treating machine proper, the upper part of which is shown in Figure 1, is a simple screw press, motor driven by a reversible electric motor, not shown. A framework is shown of structural steel—comprising two end uprights of heavy channel iron 1, 1, tied together at the top by channels 2 of which one only is visible, and tied together at the floor by angles not shown. There is suitable mounting space behind the front top channel 2 or upon it for a reversible electric motor and for gearing therefrom to the drive shaft 3 and pinion 4; whereby the large gears 5, 5 and pressure screws 6, 6 are driven. These screws run in suitable stationary nuts 7, 7, and have foot bearing plates 8, 8 attached to ram 9, whereby they raise and lower ram 9, which is shown as a wide channel with the ends cut out for guidance on the vertical end channels 1', 1'.

Two angles 10, 10 are riveted or welded to the end uprights 1, 1, to serve as supports for a bottom platen 11. This latter, as also the top platen 12, is a variable feature. The specific platens 11' and 12' as they are illustrated in more detail in Figures 3, 4, 9 and 10, for a particular four-color spot dyeing pattern have four separate liquor channels so arranged that four different dyes or liquors can be simultaneously forced to penetrate four different sets of areas of yarn in the machine. It will be understood that this particular choice of a dyeing process, of spot dyeing of skeins, and of four-colors or liquors, is merely for illustration, and that the platens might equally well be arranged to handle only one liquor over their whole area or to handle eight or ten different liquors.

Similarly the fact that the platens and choke screens and other parts shown are for dyeing skeins, and for dyeing them in short spots or areas, is merely illustrative. The numeral 11 has been used for the lower platen and 12 for the upper, in Figure 1 without the prime, and the pumping system has merely been indicated by the pipe connections 13, 14, 15, 16 in reminder of the fact that the machine, by proper choice of platens, screens and pumping system, may equally well be used as will be shown, for treating with practically any liquids, and any number of simultaneous liquids, any finely divided solids contained between screens in the machine or press.

The pressure exerted by this machine or press is closely limited, and the limits thereof are adjustable. A commercial adjustable stalling-current control relay, with automatic switches, is mounted on the press in the housing 17. This relay provides that the motor will be disconnected when its impedance is lowered by the slowing effect of encountering a predetermined mechanical resistance. The features of this press as such and of its pressure control are old, and form part of this invention only in conjunction with, and as a convenient operating means for this invention's choke screen pressure liquid method of penetrating and treating fine materials.

While a treating press or column closed to a definite position is operative with many materials, with other materials, especially if great care in disposing them between the screens is not used, as will be understood later, very wide pressure variations might result. The adjustable limited pressure feature is therefore of material value in saving time and care in loading the screens.

The quickest understanding of a fundamental operation according to this invention will probably be attained by following the stream of liquor—in the preferred exemplification of four-color spot dyeing of skeins, by following just one color of dye liquor—from the container through the pump, through its ports in the lower platen, through the skeins to be dyed and through the ports of the upper platen back to the container.

In Figure 2; 18, 19, 20 and 21 are dye containers, filled to the proper level with let us say, blue, gold, red and green dye liquors respectively. The paths of all liquors are alike, and similar elements are numbered similarly but with primes, so that it will be sufficient to follow the circulation of one color only, e. g. the blue.

Blue liquor is drawn from the bottom of container 18 through pipe 22' by the suction of positive rotary pump 23', which is driven by shaft 24' through belt 25' by main pumping motor 26. Motor 26 as shown, similarly drives three other pumps 23, 23'' and 23''' just like 23'. Continuing to follow the blue liquor, it comes from pump 23' upward through pipe 27', 4-way fitting 28', pipe 29', check valve 30', to the point or nipple designated 31', where it enters a port in the lower platen. Before going farther, the means for maintaining a constant pressure must be traced. As the liquor from container 18 comes in pipe 22' to the pump 23' it passes through T fitting 32'. This connects upwardly into pipe 33' which leads through adjustable pressure relief valve 34' into the 4-way fitting 28' already noted as on the pressure side of the pump. On the fourth side of 4-way fitting 28' is connected an ordinary pressure gauge 35'. As the pressure in the pipes and fittings above pump 23' rises, and finally attains the figure at which relief valve 34' is set to open, a certain amount of the liquor passes back through 34', 33' and 32' to the intake side of the pump.

In other words a pressure-limiting by-pass is arranged about the pump. By this means the pressure in the liquor delivered to nipple 31' can be adjusted as desired and held quite constant, and this pressure may be watched on gauge 35' by the operator.

To follow the blue liquor farther it is best to consider Figure 3 rather than Figure 2. Here nipple 31' is shown delivering the blue liquor into a port or channel 36' lying lengthwise and somewhat downwardly sloping away from nipple 31' in the body of platen 11' which must be made of material (e. g. silicon iron, etc.) that is not attacked by the liquor.

In Figure 2 this port 36' plus all its branching connections through the screens and material, plus the return port in the upper platen, are merely symbolized by the broken line oval 37'.

In Figures 3 and 4 it is seen that ten vertical feeder ports 38 open out of 36'. It is also seen that in this exemplification there are four similar longitudinal liquor ports 36, 36', 36'', and 36''' in the body of lower platen 11'. On our assumption only 36' contains blue liquor, the others contain gold, red and green liquor. Each of these feeders 38 out of port 36' opens into a laterally distributing groove 39 in the top surface of platen 11'. In Figure 3 there are shown thirty-seven of these distributing grooves, designated 39, 39', etc. Since the longitudinal port 36' we happen to be following serves every fifth one including the first and the last of the thirty-seven distributing grooves, it has ten vertical feeders 38 as stated. All other longitudinal ports—those for the gold, red and green dyes in the case assumed—will have only 9 vertical feeders. This is a mere accident of the particular pattern or sequence illustrated in Figure 3 which is a repetitive sequence, such as blue, gold, red, green;— etc. but ending: blue, gold, red, green, blue.

It will be obvious that the sequence or pattern of colors dyed on a skein depends upon the colors used in the four longitudinal ports such as 36' and upon the order or arrangement of vertical feeders taken off from each such port.

In this connection it may be noted that Figure 11 shows an arrangement of vertical feeders 38 to produce a different pattern or sequence of four colors,—what might be called a reversed cyclic sequence, as follows (using for example the same four colors): green, blue, gold, red, gold, blue, green,—repeated six times.

It will be obvious that a great variety of other vertical feeder arrangements is possible for a four-color product,—as well as that the whole gamut of colors and shades may be selected from.

It is clear then, that as shown in Figure 3 the 1st, 5th, 9th, 13th, 17th, 21st, 25th, 29th, 33d and 37th distributing grooves 39 in platen 11' will carry blue dye liquor. The others will carry gold, red, or green dye according to the arrangement of the other feeder ports 38 from the longitudinal ports 36, 36'' and 36'''.

In Figures 9 and 10 the liquor path can be followed more clearly through the screens and through the material to be dyed than in Figure 3. The blue liquor fills the first and fifth grooves 39 shown, and in each finds its upward flow impeded by the choke screen 40, which is a plate of some non-corrosive metal such as Monel metal. The liquor is prevented from escaping laterally by the soft rubber walls 42, which are moulded onto the choke screen plate 40. The liquor is thus forced to pass upwards through the small orifices 41, whence it emerges in jets as shown in greater enlargement in Figure 12.

Above the choke screen 40 with its soft rubber clothing on both sides, is placed a similar screen we may call the clamping screen, also clothed in soft rubber, but differing in having large holes 45 instead of orifices 41. This screen is for the purpose of clamping off the yarns or skeins 44 and confining the liquors against lateral flow, so that adjacent liquors will not mingle. The metal plate in screen 43 serves merely to hold the soft rubber in shape. The rubber walls 47 of clamping screen 43 are made heavier on the under side next the yarns 44 than the rubber of the upper side of choke screen 40. This is not vital, but is economical, as thus the yarns are held close to the origin of the jets while held far enough away from the screen 43 so that in bellying upward they do not touch it. The space 46 provided above the yarns by the thickness of the rubber walls 47 is for the yarns to occupy when they belly upward under the jet action. This space is all filled with liquor of course as shown in Figure 12. The jets are internal high velocity subdivisions of a stream of high pressure but relatively slow moving liquor, i. e. the jets are not in air but surrounded by liquor.

The choke screen 40 and the clamping screen 43 may most readily be thought of as large sheets of metal, of size to cover the platen 11', covered with soft rubber on both sides, and having this soft rubber removed in a number (as shown, thirty-seven) of long narrow windows, in the midst of which windows the metal is perforated. The perforations are minute jet producing orifices 41 in the choke screen 40, and are free flowing holes 45 in the clamp screen 43.

Figure 9 shows a section across a number of such windows; the open space 46 is the section of one such window. Figure 10 shows a section longitudinal of one such window 46.

The liquor (blue for example) fed under pressure through grooves 39 into the spaces 46 made by the windows in the rubber clothing of the screens 40 and 43 might be expected to seep or leak along the fibers of the yarns or skeins clamped, as at 49, between the two rubber coated screens. The skeins, which may be laid quite thick, are therefore usually first dampened with the result that the slight water contained in them fills the pores or spaces in any clamped area such as 49 and prevents this seepage as long as the hydrostatic pressure in window 46' for example is equal to that in window 46. If 46' contains gold dye, 46'' red dye, 46''' green dye, and all at substantially equal pressure, the penetration of these liquors into the clamped areas of yarn, such as 49, is practically nil, and the delimitation or cut-off of the dyed areas is very sharp. Even without dampening the yarn, if the pressures on both sides of a clamped area such as 49 are equal little penetration occurs because the air cannot be driven out by the capillary advance of the liquor.

In case, as often occurs, a pattern is desired in which no dye at all would be used in (for example) window 46'', it is desirable to feed plain water through the color port system of which window 46'' is a part. This water should be at the same pressure as the dye in the other systems. This prevents seepage of dye from windows 46' and 46''' toward window 46'', and thus prevents an irregular margin or cut-off of the areas of yarn dyed in windows 46' and 46''', as would occur if the pressure in window or space 46'' was materially lower than in 46' or 46'''.

To maintain the pressure in all the ports and spaces such as 46 it is necessary to prevent the escape of the liquors to the atmosphere. The sectional views of Figures 9 and 10, also of Figure 14, show one means of accomplishing this. In the rubber clothing of the under side of the clamp screen 43, for example, is practiced a groove 50 running clear around the periphery of the screen. On the rubber clothing of the top of choke screen 40 is formed a corresponding ridge or tongue 51. While it is not easily shown in the drawings it has been found best to make this tongue 51 slightly higher than the depth of the groove 50, and fully as wide, so that when the press machine Figure 1, is closed upon these screens the tongue 51 more than fills the groove 50 and expands tightly in the latter. The pressure areas 52 and 53, where the outer rubber rim of choke screen 40 bears on the smooth top surface of lower platen 11' and where the outer rim of clamp screen 43 bears on the smooth bottom surface of top platen 12', seem not to require this tongue and groove in order to be tight enough, though when necessary a groove might easily be practiced in the platens and a tongue on the rubber covered screens. The reason the tongue and groove seems to be more needed between the screens is that it is between the screens that the yarn or skeins are piled. At 54a for example, Figure 9, is seen the end of a skein projecting between the rubber rims of the two screens 40 and 43. The skeins may often be piled up to a depth of the order of ¼'' or ⅜'' before compression. This makes for considerable distortion of the rubber between the screens, when pressure is applied and at such a spot as 54a the liquor in window or space 46 might more easily find a vent to atmosphere if the tongue 51 in groove 50 did not make a barrier. Of course any other well known means may be used for providing a system that will not leak to atmosphere. It is noteworthy that no pressure differences of importance exist from one window to the next, e. g. 46 to 46'. The problem of maintaining the pressure in all windows without leak to the outside is the only problem. The balance of pressures between windows is why such narrow walls 47 of rubber, clamping such narrow areas of yarn as shown at 49, Figure 9, may be depended upon to avoid all seepage and give a sharp cut off to the dyed areas.

The structure of the screens, 41 and 43, requires in each case means to hold the rubber clothing in its place on the metal sheet. This may be done by one of the well known modern methods of attaching or welding soft rubber to metal. Because, however, at the temperature of boiling water these methods are not reliable, and because the dye liquors may be used at nearly that temperature, the metal sheets of both the choke screen 41 and the clamp screen 43 are perforated with a large number of holes 54 suitably spaced, through which the rubber on both sides of the metal is molded and thus tied together and held in place relative to the metal sheet. In Figures 6 and 7, which show respectively the top or plan view of clamp screen 43 and of choke screen 41, may be seen the distribution of some of these rubber tie holes 54.

Both the screens 41 and 43 are shown in Figure 9 reinforced at the ends and corners by welded-on extra metal strips 48. This is useful to avoid battering of the edges of the screen proper, and to stiffen it in one direction (the screens are quite flexible) and thus to facilitate both handling and the proper location of the screens on the lower platen. This proper location is of course vital in order that the windows in the screens shall register over the liquor distributing grooves 39. The location is provided by abutting the two rear corners of the screens, (the corners at the back of the press as viewed in Figure 1) against four stop lugs 55 which are integral with the bottom platen 11'. These lugs are best seen in their plan relation in Figure 5. Figure 4 shows one of them in sectional elevation with the reinforced edges of the screens butted against it.

The action of the choke screen, and jets thereby produced, is the vital point in this invention. It seems more logical however to follow first the liquor stream throughout its circuit and to return to this vital point later.

In Figure 9 it will be seen that there are grooves 56, 56', 56'', 56''', in the lower face of upper platen 12', corresponding to and immediately above the distributing grooves 39, 39', 39'' and 39'''. We may call these collecting grooves in this structure, which is made for a one-way liquor flow. In Figure 14, which shows a screen structure for a two-way liquor flow, the grooves in both the top and bottom platens have, alternately, both the distributing and the collecting function, and are all designated by the numeral 39 and primes.

The blue liquor having passed through the orifices 41 and, by the boring action of the resultant jets, having easily penetrated the layer of yarn 44 into the space or window 46, now passes without material pressure drop through the free holes 45 of clamp screen 43 and thus into the collecting space or groove 56. Then it is led by the vertical feed port 57 in platen 12', (corresponding to port 38 in platen 11') into the longitudinal port 58' (Figure 4) which is one of four practiced in the upper platen. These correspond to the ports 36, 36', 36'', 36''' in the lower platen. 36' and 58' carry blue liquor, we are assuming. The others red, gold and green. These longitudinal ports 58, 58', etc., do not carry liquor under much pressure, and are therefore designed as mere deep troughs or grooves in platen 12'. Like the ports 36, to 36''' they slope slightly. This slope is for more perfect drainage, so that a minimum of liquor will remain to be washed out at the end of the dyeing cycle. Figure 4 shows these ports in section. Figure 5 in plan. Figure 5 also shows in plan the collecting grooves 56 of the upper platen, and the vertical feeder ports 57. It will be remembered that Figure 11 was laid out showing an arrangement of the vertical feeder ports 38 to produce a reversed cyclic pattern of the type: green, blue, gold, red, gold, blue, green,— rather than the straight repetitive pattern produced by Figure 3 of the type: blue, gold, red, green; blue, gold, red, green. Similarly Figure 5 shows the upper platen 12' and its vertical feeder ports 57 laid out to give the reversed cyclic pattern, i. e. to correspond to and cooperate with the lower platen of Figure 11. No plan views of the lower or upper platens of Figure 3 and Figure 9 is given. The arrangement of ports 38 and of ports 57 must of course correspond in any pattern used.

From longitudinal port 58' (included in the symbolical broken line oval 37' of Figure 2) a pipe connection 59', rigid with upper platen 12' and raised and lowered with 12' when the press is opened or closed, conducts the blue liquor to swivel joint 60' and thence into swinging cock 61'. The delivery end 62' of the latter (see Figure 15 for an elevation) is normally over container 18 during dyeing. Figure 5 shows this whole run-off piping connection and swivel cock quite clearly in relation to upper platen and to container 18. The different pattern or arrangement of vertical feeder ports 57 in this figure has no bearing on these run-off piping connections.

We have thus traced the blue liquor from container 18 through the pump, and pressure regulating by-pass, into port 36' (one of four such) which port 36' feeds (Figure 3) ten distributing grooves and ten windows like 46. (Figure 9), each with a long row of jet forming orifices 41, (see Figure 10 for sectional elevation and Figure 7 for plan of such a row of orifices) and thence we follow it through ten areas of the yarn 44 into ten collecting grooves 56 and finally into one longitudinal port 58' (one of four such) and back into container 18.

It is seen that, in this particular exemplification there are four circulating systems, entirely separate, capable of applying simultaneously four different dye liquors to four sets of small areas of yarn in skeins or the like. It is seen that the original stream of one color is divided into a large number (in the example, ten) of smaller streams and that each of these is in turn subdivided into a very large number (of the order of hundreds) of fine high speed jets for passage through the mass of yarn or other fibrous material. That these jets are re-coalesced into streams (ten in the example) and these into one main return stream.

Figure 14, as mentioned, shows a variation of the general structure of the screens of Figures 3, 4, 5, 9, 10, 11, arranged, for reverse flow. A plurality of choke or orifice screens 40 are superposed, and the top screen is not a mere support for rubber clamping surfaces, as is the screen 43 of Figure 9, but is also a choke or orifice screen. The thickness of the rubber pads or clothing on both sides of the yarn layers 44 is here made as great as is that thickness above the yarn 44 in Figure 9. The pressure setting of the valve 34 (Figure 2) for use with the pile up of Figure 14 would require to be rather more than three times that for use with the screen pile-up of Figures 3, 9, 10, because there are three choke screens in the circuit and because the yarn is held slightly farther from the jets, which need to be a little stronger for this reason.

Figure 15 is a general diagram of one of the several separate reversible circulating systems used with the Figure 14 screen structure. 63 is a container. 64 is a positive rotary pump drawing from 63 by pipe 63a and delivering through pipe 65 into two-way valve 66. Pressure regulating means, such as the by-pass and relief valve 34 of Figure 2, or other well known pressure regulation, are required, but omitted for simplicity of the diagram. With the valve 66 set as shown the stream flows via pipe 67, check valve 68 and T 69 into one of the main ports of lower platen 11, where it is divided and subdivided in the described manner and where it enters among others port 38 and left hand distributing groove 39, for example of Figure 14. It subdivides into jets and penetrates the first pack of yarn 44; recoalesces and subdivides into jets again and penetrates the second pack of yarn; coalesces again and subdivides into jets for the third time, these last jets doing no useful work. It then gathers in upper distributing groove 39 and flows by upper port 38 into a main port of upper platen 12' and thence by T fitting 70 (Figure 15) and flexible hose 71 through two-way valve 72 and swing cock 61 with its down pointed nozzle 62 back to container 63. This traces the flow upward through the first or left hand series of windows of Figure 14.

If now valves 66 and 72 are both turned counter clockwise 90 degrees, the stream will flow from container to valve 66 as before, thence through pipe 73, flexible hose 74, check valve 75 into a main port of upper platen 12. These ports may not, as in the one way flow, be open grooves, but must be pressure tight. Here it subdivides into a number of parts, such as the upper 38 of Figure 14, and jets downward through the orifices of the topmost screen 40 and into the topmost pack of yarn 44, gathers together beneath the latter and jets downward through the orifices of the middle screen 40 and into the second pack of yarn, and finally jets (uselessly) through the orifices of the bottom screen 40, to be gathered again in lower distributing groove 39 and lower port 38 and thence into a main port of lower platen 11. From 11 it emerges into T 69, thence through pipe 76 and valve 72 into swinging cock 61 and back to container 63.

The screen pile-up of Figure 14 is merely illustrative. A much larger number of screens and layers of yarn can be used. The liquor becomes exhausted and less active as it passes through successive layers of yarn, but the flow of liquor in the upward direction, if continued long enough, establishes a substantially uniform gradient of effect (e. g. color) in the yarn treated, from bottom to top; the reverse flow then obtained by shifting valves 66 and 72 as described, superimposes a reverse gradient of effect (e. g. color), so as to produce a substantially uniform treatment of all the yarn layers.

The limitation on the number of layers of yarn and screens that can be so used in series is substantially this: if the liquor is of such strength and activity that it affects the first layer of yarn excessively (e. g. dyes it too deep a shade) before sensibly affecting the last layer, so that a uniform gradient of effect or color cannot be established from top to bottom without reaching at one point an undesirably strong effect or dark shade, and if the liquor cannot be reduced in strength or activity without making the dyeing or treating operation expensively slow, then the number of screens and layers in series must be reduced. From this it is evident that reverse flow dyeing of many layers is more economical with the less rapidly exhausted or less active liquors, and also when the darker shades are desired, and is less economical the lighter the shade desired and the more rapid the liquor.

In connection with a four-liquor dyeing or other treating operation such as illustrated and described, whether one way or reversed flow be practiced, it is often desired to prime or prepare all the yarn areas with a common liquor, also after the four liquor dyeing it is almost universally necessary to wash all the yarn with water, or with water plus a fixing salt or the like. A separate common liquor circulating system is shown in Figure 2 for this purpose, and shown for more clear visualization separately in Figure 15A. Such a separate system is very much more convenient than utilizing the containers 18, 19, 20 and 21 and the four small pumps 23, 23', 23'', 23''' with their circulating systems.

The intake pipe of 77, Figure 2 or Figure 15A, is connected to a supply, not shown, of the common liquor, (e. g. plain hot water) and delivers it, subject to the opening of valves 79, 79', 79'' and 79''', into the longitudinal ports 36, 36', 36'' and 36''' of lower platen 11'. These ports it enters by pipes 80, 80', 80'' and 80''', each with check valves, of which valves only 81' is shown (Figure 3). The water or common liquor enters port 36' at the lower end of its slope which permits it more fully and completely to drive before it any remaining dye or other liquor. The common liquor thus introduced under pressure into each of the four liquor systems follows in each the same paths of division and subdivision and re-coalescing as the dye or other liquor. To avoid contamination or watering of the contents of containers 18, 19, 20 and 21 the swing cocks 61, 61', 61'' and 61''' are at this time swung to the right by the common bar 82, so that they deliver into drain funnels 18', 19', 20' and 21' which, for convenience, are attached to the sides of the containers. These funnels lead to the sewer or waste water sump.

There has thus been completely traced the paths of the liquors in the illustrated structure for handling several liquors simultaneously, both in the one-way and in the reversed flow variants,—and also the path of washing or other common liquor. The structures described so far are all adapted primarily to the treating of masses of yarns or other filaments in substantially parallel arrangement, as in skeins, this being one of the most difficult of all problems in the pressure penetration by liquors of finely divided solids. It is also one in which there is commercial advantage in the simultaneous treatment of different parts of the material with different liquors.

Figures 8 and 13, taken with some of the details already described, show the much simpler problem of treating either pulverized materials (where obviously there is no need for several simultaneous liquor treatments of different parts) or formless masses of fibers without parallel arrangement, such as means of carded fiber, raw stock, etc. On raw stocks it might occasionally be desirable to apply variegated colors, and the structures above described for yarns in skeins could be applied to this end with the modification of supporting lattices taught in Figure 13.

Figure 8 shows diagrammatically the simple circulating system required for treating, according to this invention, most finely divided solid materials. For simplicity, pressure regulating means, which may be the same as shown on Figure 2, has not been shown. In many cases it will not be needed. 82 is a tank of treating liquor. It is shown conveniently placed on a wall, but may be at any height or location. 83 is a valve which, when opened, permits the liquor to be drawn through pipe 84 into positive rotary pump 85, driven by motor 86. Thence it is delivered under adequate pressure through pipe 87 into the lower part of treating chamber 88. Pressure may be controlled by the speed of motor 86, or by providing as in Figure 2 a by-pass from pipe 87 back to pipe 84 with a pressure limiting relief valve in this by-pass, or by many well known means.

Treating chamber 88 is a tight and strong container, with a tight but removable cover 95 in which is piled a series of material holding trays 89, each comprising a choke screen and a material retaining lattice. See Figure 13. These trays may either be clamped, e. g. by the cover, at gasketed edges 94 one upon the other and upon a suitable seat 93, or may fit closely within the container 88, or be otherwise so mounted within 88 that the liquor will be forced to pass through the screens. From the space above the top tray the liquor returns to tank 82 by pipe 90 if it is to be recirculated. If or when it is contaminated or exhausted by passage through the trays of material it is delivered to sump or sewer by opening valve 91.

The essential structure of trays 89 is shown in Figure 13. Each consists essentially of a choke screen 96, full of fine orifices 41, which differs from the screen 40 of Figures 9, 10, 12 only in being thicker or reinforced to span a larger area. The rubber partitions or walls 47 of Figure 9, which support screen 40 against the hydraulic pressure, are not used since no separation between two different liquors is assumed. The multiple jets from these choke screens 96 act on the loose material in space 97. The retaining lattice or screen 98 serves to prevent the loose material being carried out of range of the jets. Between lattice 98 and the next choke screen 96 must be a space for the liquor stream to be reformed and redistributed to the next set of orifices 41. One convenient and cheap structure to provide this liquor distributing space and to support lattice 98 against the stream pressure is a layer of an open coarse spiral wire mesh 99 interposed between the lattice 98 and the choke screen 96 and attached to the latter.

It will be obvious that, where it may be desired piebaldly to color raw stock or masses of loose fibrous material, that cannot be held in the jets by their own tensile strength like yarn, the whole structure of Figures 1, 2, 3, 9, 10 may be used with the simple addition of a lattice 98 and a coarse mesh backing 99 in every window or space such as 46 of Figure 9, for the purpose, just as in Figure 13, of holding the loose mass in the field of the jets.

In Figures 12 and 13 an attempt has been made to show the vital action of the jets on the material, the conception and application of which constitutes the most fundamental feature of this invention. In Figure 12 two jets are shown, much enlarged. In practice orifices of the order of 1 millimeter in diameter are found excellent for skein dyeing. Except for cost and (depending upon the liquors used) danger of filling up the orifices, still finer ones and still more of them are better. The pressure to use to create active jets with orifices of 1 millimeter is at least 10 lbs. per square inch per choke screen. This, however, varies with the material to be treated, and must also be understood not to include the pressure necessary to overcome the friction of the pipes and ports and various passages—all of which must be relatively much less than the resistance of the choke screens. The principles of this invention outlined in the early part of this specification are referred to.

A jet in Figure 12 is seen to impinge upon and by its highly localized kinetic energy to work apart the band of yarns or filaments in front of it. In so doing it presses this band away from choke screen 40, as is indicated by the liquor filled space 40a, and separates the filaments. The jets, accompanied by very active eddy currents of the liquor, work clear through a band of reasonable thickness, one which could not be penetrated except in weak spots by a steady or non-turbulent stream at the same or even a much higher pressure. The filaments are thrown into such lateral agitation that those for some distance on each side of a jet are separated and penetrated by the eddy currents. It is probable that many of them are briefly swept into the jet itself by the eddies. If the resistance to stream flow by the band of yarn is high at the start, this active separation of filament from filament, this local disintegration of the band as a band almost instantly reduces the resistance to be negligible. As early pointed out above in the general discussion of principles if there happened to be no yarn at all opposite say the left hand jet of Figure 12, and a thick band covering the other, the left hand jet would still carry practically no more water and the right hand jet would still agitate and penetrate just as intimately the yarn in front of it. Provided only that the to-be-treated areas of skein (for example) are exposed to jets on sufficiently close centers that the areas of active agitation and eddying of adjacent jets always overlap, this method of intimately bringing liquor into contact with filaments produces very uniform results in spite of any and all irregularities in the structure of the filament masses. In this it surpasses previously known methods, which always depend upon an open and uniform structure of the filament masses. A thick skein of the finest rayon or silk, a mass practically impenetrable to any ordinary stream, and a mass through which when damp the sharpest needle cannot be thrust, disintegrates before the choke screen jets and becomes of practically negligible resistance.

The liquor stream, which for a certain distance beyond choke screen 40 is a most turbulent mass of jets, and eddies, becomes a relatively steady and unturbulent stream again in the space 46 (Figures 9 and 12), and is ready, if desirable, to be forced through a second choke screen. Figure 12 shows a clamping screen 43 with its free holes 45, just as in Figure 9. It must be understood, however, that where the exhaustion of the liquor does not preclude, several choke screens and layers of yarn can be placed successively.

It will be obvious that, in the direction of the filaments, the eddy currents can penetrate between all filaments even more effectively than across them. For this reason the orifices 41 may be placed about three times as far apart in the yarn lengthwise direction as in the across yarn direction. In the Figure 9 structure, a concrete example, perfect dyeing of fine skeins occurs throughout any window 46 with only one row of orifices on about $\frac{5}{32}$" centers down the center of an approximately ½" wide area.

In Figure 13, where granular solids are shown, the jets and eddies carry the fine material swirling around and give to all of it a uniform exposure to the liquor. For fine materials that can be so carried, as distinct from raw stock and fibrous mats, the orifices need not be quite so closely spaced nor so fine nor the pressure so high, as for fine yarns in skeins.

Figure 16 shows a choke screen dyer or treater for skeins where the whole of the skein is to be dyed one color or given the same treatment. 100 is the tub or bath. It will be full of liquor to the level of overflow 101 when in operation. It may be heated if desired by steam jacket or otherwise. 102 is a pipe connection from a pressure pump (not shown) delivering liquor from a prepared supply. The overflow 101 will usually return the liquor to this supply, but can also deliver to a sump or sewer, depending upon the state of exhaustion of the liquor. 103 is a cylindrical sheet of suitable metal pierced with small orifices 41 (see also Figure 17) in a suitable pattern. These orifices, for example, might be ³⁄₃₂″ apart on vertical centers and ½″ apart on horizontal centers, depending upon the material, the weight of skeins, the liquor used, the pressure and the orifice size. This cylindrical choke screen is closed at the upper end by cap 104, held down by bolts 105. 107 is a drain pipe in which is a valve (not shown) closed during operation, for draining the tub. Cap 104 has a rim 108 overhanging the cylindrical choke screen by enough to prevent any skein from easily floating up over it when the liquor is up to overflow level, yet permitting the skeins easily to be put over it in the manner of putting on a clinker tire. The diameter of the rim 108 of cap 104 is greater than the inside diameter of the skein but not much greater.

In the operation of this device a number of skeins, determined by trial to be all the machine will adequately and uniformly treat, is placed over the cylindrical choke screen 103, one above the other. Liquor might then be pumped in through 102. However, since the jets at the top will for a long time while the tub is filling, be not surrounded by liquor to form eddies, and since the lower jets will be more quickly covered by liquor and therefore more effective earlier, it is better first to pour or pump the tub quickly full of liquor to cover all the choke screen before starting the jetting. This floating in liquor also makes the skeins distribute vertically much better. When the pressure within the cylinder comes on the skeins are forced at all points away from the orifices, the pressure of the jets being much greater close to their points of origin. The skeins therefore distribute themselves under tension quite uniformly about the cylinder, tending neither to touch it nor to get far away. This tension, the force of the jets, and the floating action of the tub full of liquor tend to cause very uniform vertical distribution also. The penetrating and agitating jet and eddy action is the same as described above in connection with Figure 12.

Figure 17 shows the jets holding the yarns away from the choke screen by a space 107 which tends to be the same all around the cylinder. The treatment of skeins in this, as well as in the Figure 9 type structures is extraordinarily rapid. For example skeins that might require 20 minutes or more to dye well in the ordinary bath on sticks, with hand turning, may be adequately dyed in a minute or two by this active and intimate jetting and eddy agitation.

After a sufficient treatment the liquor is drained off by drain 107 and usually a wash or fixing liquor will be applied for a still shorter time through the inlet 102 and choke screen 103. With a tub or device of this sort the time for handling the skeins in and out and for valve manipulation is greater than the dyeing or treating time and the time for filling or draining. It is therefore very economical of labor as well as of space.

Figures 18 and 19 show a form of bobbin or reel suitable for use in treating, in the tub of Figures 16, almost any yarns or filaments on the original reel without rewinding into skeins. In the manufacture of some forms of artificial silk, (e. t. nitrocellulose type) it is necessary at present to reel the filament into skeins and to submerge these skeins completely, and before they can dry at all, on sticks in a denitrating bath, where they are turned and agitated by hand. Long rubber gloves must be used in this bath. This is laborious, dangerous and expensive. In many other processes of yarn or filament manufacture it would save rewinding to be able to treat or dye the product on the original take-up bobbin. To make this possible by the choke screen method it is only necessary that the yarn, wound in a suitable layer on a bobbin having a choke screen core, be slacked off enough to permit of the jet and eddy agitation already described.

In Figures 18 and 19, 109 is an upper bobbin head, and 110 a lower head. These are held in firm relation by shoulder bolts 111. The upper head 109 is provided with a trunnion 112. The lower head has an internally threaded boss 114 adapted to fit on the externally threaded boss 115 in tub 100 (Figure 16). The threaded trunnion piece 113 screws into boss 114 to provide the other bobbin trunnion when in use as a bobbin. Grooves 116 are practiced in the inner faces of the bobbin heads 109 and 110. In these grooves lies a cylindrical choke screen, made by rolling up to a cylinder a sheet of Monel metal having a proper pattern of orifice holes 41 in it. When the edges of this sheet (reinforced by a turned in rim 118) are brought together the inside of the cylinder so formed fits tightly at its ends to, and centers on, the smaller diameter shoulders of grooves 116. Cam lugs 119 are riveted to one edge of the cylindrical sheet and cam lugs 120 to the other edge. Lugs 119 straddle lugs 120. Journaled in the heads 109 and 110 is a cam shaft 121, that may be turned 180° by a wrench. On this cam shaft are cams or eccentrics 122 which fit closely one way in the oval slots 123 of cam lugs 120, but which have therein a freedom in the other or radial way. The cam shaft itself, adjacent these cams, fits similarly with closeness in one direction and with freedom in the other in oval slots in cam lugs 119. Thus when the eccentrics or cams 122 are positioned as shown in the drawings, i. e. with their greater radius, Figure 19, toward the bottom of the figure, the cam lugs and hence the edges of the cylinder are drawn together. When the cam shaft is turned 180° from the position shown the edges of the cylinder are spread apart and its outer surface presses out at the top and bottom against the larger diameter shoulder of grooves 116. It is in this expanded condition of the bobbin that filament should be wound on it.

Bolts 105, cylinder 103 and cap 104 are to be removed from the tub of Figure 16. The expanded bobbin, wound to a suitable depth with filament, with trunnion piece 113 removed, is screwed home on boss 115 of tub 100. The tub is filled with liquor and cam shaft 121 is then turned to the position shown, collapsing the bobbin core and butting the ends 118 tightly. Some leakage will occur between these ends, but this acts simply like another thin jet and does no harm. The liquor under pressure is introduced through pipe 102 and bosses 115 and 114 into the bobbin. The action and procedure is thereafter the same as for the Figure 16 structure, except that at the end the whole bobbin of filament is removed for further processing or for rewinding.

What is claimed is:

1. A skein dyeing device comprising means forming a pocket for receiving yarn to be dyed, means for forcing dye through said pocket, and choke screen control means for equalizing the resistance to passage of dye through said pocket over its entire area, said resistance being greater than any other impedance, the fibers of the yarn included, in the dye stream.

2. A device in accordance with claim 1 wherein the control means comprises a plate having a plurality of perforations, the size of said perforations being such that said plate offers more resistance to the flow of dye than the skein being dyed.

3. A dyeing device comprising means for holding the material to be dyed, means for imparting high pressure to dye, and high resistance perforated means for causing said dye to strike said material in the form of a plurality of spaced jets of high velocity, said resistance being greater than any other impedance, the fibers of the material included, in the dye stream.

4. A dyeing device comprising means for holding the material to be dyed, a distributing plate positioned adjacent to said material, said plate having a plurality of fine spaced nozzles therein, and means for forcing dye through said nozzles into said material in highly kinetic jets, the resistance of said plate to the flow of the dye being greater than any other impedance, the fibers of the material included.

5. In a liquid treating system for fine solids, means to produce a pressure stream of liquid, interposed in the stream a uniformly and highly obstructive choke screen comprising a barrier sheet and jet producing orifices that pierce said barrier sheet; and means to support in the stream masses of fine solids near to and downstream of said choke screen, said choke screen offering a greater resistance in the pressure stream of liquid than any other impedance, including the fine solids.

6. In a liquid treating system for fine solids; a conduit for a liquor flow; means to force through said conduit a flow of liquor against a material impedance; means to control the pressure of said flow; a treating chamber forming part of said conduit; in said chamber a plurality of choke screens seriatim in the flow and each impeding the flow,—each comprising a barrier member pierced by many and substantially evenly distributed orifices to constrict the flow into high velocity jets,—said plurality of choke screens constituting the larger part of that material impedance against which the flow of liquor is forced; and means loosely supporting against the flow and near to and downstream of one of said plurality of choke screens, quantities of the fine solids to be treated.

7. In a liquor treating system for masses of fibrous material: an enclosure to conduct a flow of liquor; means to force through said enclosure a flow of liquor against an impedance; means to reverse the direction of the flow through said enclosure; a treating chamber forming part of said enclosure; in said chamber a plurality of jet producing choke screens seriatim in the flow, each impeding the flow, and constituting together the larger part of the impedance to be overcome by said means to force; means to open and close said chamber to change the material to be treated; and means supporting a mass of the material to be treated near to and downstream of at least one of said choke screens in whichever direction the flow may be forced.

8. In a skein dyer, a dyeing chamber, means to force a stream of dye liquor through said chamber; a choke screen in said chamber surrounded by a raised resilient clamping surface, a second resilient clamping surface registering with the first to hold a portion of a skein in a position near to and on the downstream side of and spanning said choke screen, and means to apply pressure to force said raised and said second clamping surfaces together upon a skein, said choke screen offering a greater resistance to the flow of dye liquor than any other impedance, the skein fibers included.

9. In a skein dyer: a plurality of dyeing chambers; means to force a plurality of liquors simultaneously through certain of said chambers; in each of a plurality of said chambers a choke screen; and means in more than one of said chambers to support portions of one and the same skein near to and downstream of more than one of said choke screens, whereby portions of one skein are simultaneously treatable by different liquors, said choke screen offering a greater resistance to the flow of dye liquor than any other impedance, the skein fibers included.

10. In a multicolor spot dyeing system for yarn in skeins or masses: a plurality of liquor supplies; a force pump for each; means to predetermine the pressure at which each of said pumps delivers liquor; separate delivery passages, at least one for each of said liquor supplies, and having a plurality of branches; a series of pressure closable treating spaces adjacently arranged and each enclosed and separated from the next and from outside space, when closed, by walls comprising resilient material, each of said spaces being connected for its liquor supply to a branch of one of said separate delivery passages; a choke screen in each of said treating spaces to form active jets in a liquor flow forced into said treating spaces by said force pumps; a set of separate collecting passages corresponding to said delivery passages and leading back to said liquor supplies; a set of branch collecting passages leading into each of said separate collecting passages from said treating spaces and corresponding to said delivery passage branches as to the treating spaces served, whereby throughout all the network of said liquor supplies, force pumps, and delivery passages and branches, treating spaces, collecting passage branches and collecting passages the liquor from each of said supplies is kept from mixing with the liquor from any other of said supplies; a press machine to open said series of adjacently arranged pressure closable treating spaces so that across the walls of a plurality of said spaces can be laid a mass of yarn to be treated; and means including said press machine to close the resilient material of the walls of said spaces tightly upon such mass of yarn, whereby sequential small areas of such yarn may be simultaneously permeated by liquors from different ones of said plurality of liquor supplies.

11. In a spot dyeing machine for treating yarns in skeins, or similar masses: a series of choke screen areas; resilient walls surrounding said areas; a registering series of drainage areas; resilient walls surrounding them and forming with said first walls a series of treating spaces; means to separate said first and said second resilient walls to lay a yarn mass between them and spanning a plurality of said choke screen areas; means to press together in registry both sets of said resilient walls to enclose portions of one such yarn mass within a plurality of said treating spaces; means including a plurality of liquor supplies and pumps to force a flow of one liquor through one of said choke screen areas to jet into one of said treating spaces and to permeate the portion of the yarn mass therein enclosed, and simultaneously to force a flow of a different liquor through an adjacent one of said choke screen areas to jet into and permeate the yarn in an adjacent one of said treating spaces; and means to equalize the liquor pressure in one of said treating spaces with that in an adjacent one of said treating spaces.

12. In a liquid treating system for fine solids: a conduit for a flow of liquid; an enlarged treating chamber in said conduit; means to force through said conduit a stream of liquid having a considerable head; a choke screen in said chamber, said choke screen comprising a flow barrier and distributed small orifices that pierce said barrier, and that are of number, form and size to absorb a large part of the head of the stream, said choke screen offering a greater resistance to the liquid stream than any other impedance, the fine solids included.

13. In a pressure liquid treating system for finely divided solids, a conduit, a means to supply a flow of liquid therein under pressure, a choke screen therein obstructing the flow and forming a needle spray within the flow, said choke screen offering a greater resistance to the liquid stream than any other impedance, the fine solids included.

14. In a skein dyer, means to create a stream of pressure liquid and a choke screen in the stream, said choke screen offering a greater resistance to the liquid stream than any other impedance, the fine solids included.

15. In a liquid treater for fine solids, a force pump, a choke screen through which liquid is forced by said pump in fine jets and means to hold fine solids relatively near to said choke screen, said choke screen offering a greater resistance to the liquid stream than any other impedance, the fine solids included.

16. In a liquid treating system for fine solids; a conduit for a flow of liquid; means to force through said conduit a flow of liquid having a considerable pressure drop; a choke screen in said conduit absorbing a considerable part of this pressure drop; means to insert masses of the material to be treated into said conduit just downstream of said choke screen; and means to support these masses at this point in the flow without compressing the to-be-treated portions, said choke screen offering a greater resistance to the liquid stream than any other impedance, the fine solids included.

17. In a spot dyeing machine for skeins and fibrous masses a plate covered with a thickness of soft rubber, windows through the rubber exposing said plate, fine orifices piercing said plate and distributed in a pattern in several of said windows, a second plate covered with a thickness of soft rubber, windows through the rubber exposing said second plate and registering with said first windows, orifices or openings through said second plate in one of said second windows, means to press said first and second plates together in registry and clamping upon layers of material to be treated spread over several of said windows, a sealing about said first and second plates to retain pressure liquids within said plates, two supply means, one to force one liquor through the fine orifices in one of said windows and another to force a different liquor through the fine orifices in an adjacent one of said windows of said first plate, to produce jets of liquor through said windows and impinging upon the material between said plates, and control means to balance the pressure of the liquors forced by said two supply means, whereby the different liquors under pressure in adjacent ones of said windows are unable to penetrate between said plates from one window to an adjacent one through the relatively pervious layer of material to be treated.

18. In a skein dyer a treating chamber, a pump forcing a stream of liquor through the same, a choke screen dividing said chamber into a high and low pressure part and causing the stream to flow from the high into the low pressure part in the form of many distributed high velocity jets, said choke screen offering a greater resistance to the stream of liquor than any other impedance, including the fibers of the skein.

19. In a skein dyer a treating chamber, a pump forcing a stream of liquor through the same, a choke screen dividing said chamber into a high and low pressure part and causing the stream to flow from the high into the low pressure part in the form of many distributed high velocity jets, and retaining means for skeins in said low pressure part of said chamber, said choke screen offering a greater resistance to the stream of liquor than any other impedance, including the fibers of the skein.

20. In a liquid treating system for masses of fine solids, a source of pressure liquid, a treating chamber through which the pressure liquid is forced, means to hold masses of the fine solids to be treated in said chamber, and a choke screen in said chamber near to and generally speaking on the under side of the masses to be treated to produce generally upward jets into the material, said choke screen offering a greater resistance to the flow of liquid than any other impedance, including said solids.

21. In a skein dyer, a source of a pressure stream of liquid, a lower plate, an upper plate, resilient facing on at least one of said plates, openings in said plates, in at least one of said plates these openings being of small size to produce high velocity mass penetrating jets in the stream of liquid, a press machine to close said upper and lower plates together and to enclose skeins or the like between them, and adjustable means to predetermine the pressure at which said press machine closes said two plates together, said lower plate and upper plate offering a greater resistance to the stream of liquid than any other impedance, including the fibers of the skein.

22. In a spot dyer for skeins, a plurality of dyeing chambers, means simultaneously to force a different liquor through each of said chambers, choke screens in said chambers, and alternative means simultaneously to force one liquor through all of said chambers, said choke screen offering a greater resistance to the stream of liquor than any other impedance, including the fibers of the skein.

23. In a liquid treater for masses of filaments, a treating chamber, a choke screen forming a substantially cylindrically curved convex wall of said chamber, means to span said choke screen in the generally curved direction with lengthwise masses of the filaments, and means to force liquor through said choke screen to jet into said chamber through the spanning masses, said choke screen offering a greater resistance to the flow of liquid than any other impedance, including the fibers of the filaments.

24. In a filament dyer a substantially cylindrical choke screen of diameter to be loosely compassed by massed loops of filaments, a container forming about said cylindrical choke screen a liquid fillable treating chamber, and means to supply a pressure flow of liquid to the inside of said cylindrical choke screen adequate to cause jetting of liquid into said container through the massed loops to be dyed, said choke screen offering a greater resistance to the flow of liquid than any other impedance, including the fibers of the filaments.

25. In a filament dyer, a substantially cylindrical choke screen to be compassed by a mass of filament, a container forming about said choke screen, a treating chamber to contain liquor, means to reduce the periphery of said cylindrical choke screen to loosen upon itself the compassing mass of filament, and means to supply a sufficient pressure flow of liquor to within said choke screen to cause jetting of the liquor into said container through the loosened compassing mass of filament, said choke screen offering a greater resistance to the flow of liquid than any other impedance, including the fibers of the filaments.

26. In a filament treater, a bobbin, a cylindrical choke screen as the core of said bobbin, onto which a mass of filament may be reeled, means to collapse said cylindrical choke screen to relax the tension of filaments reeled upon it, and pressure supply means to force treating liquid to jet outwardly through a mass of filament reeled upon said cylindrical choke screen, said choke screen offering a greater resistance to the flow of liquid than any other impedance, including the fibers of the filaments.

27. In a pressure liquid treater for finely divided solids a treating chamber, means to support therein masses of finely divided solids, a choke screen forming a surface of said chamber, means to force a liquid through said choke screen to jet into the masses, and means, without removing the masses, to force a second liquid through said choke screen into the masses, said choke screen offering a greater resistance to the flow of liquid than any other impedance, including said solids.

ARTHUR HERMAN ADAMS.